No. 667,316. Patented Feb. 5, 1901.
W. A. HUDSON.
PROCESS OF SEPARATING THE FLEXIBLE PORTIONS OF LEAVES FROM THEIR STEMS.
(Application filed Feb. 28, 1899.)
(No Model.) 2 Sheets—Sheet 1.
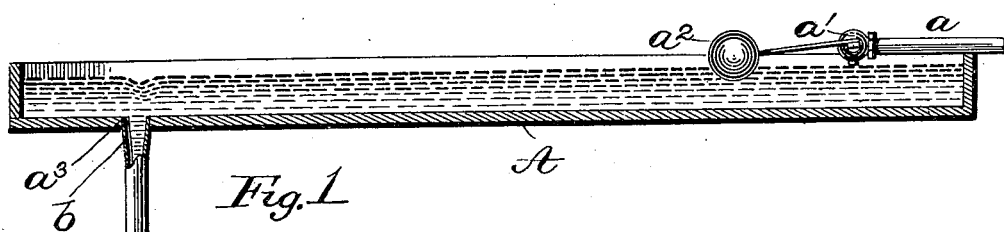
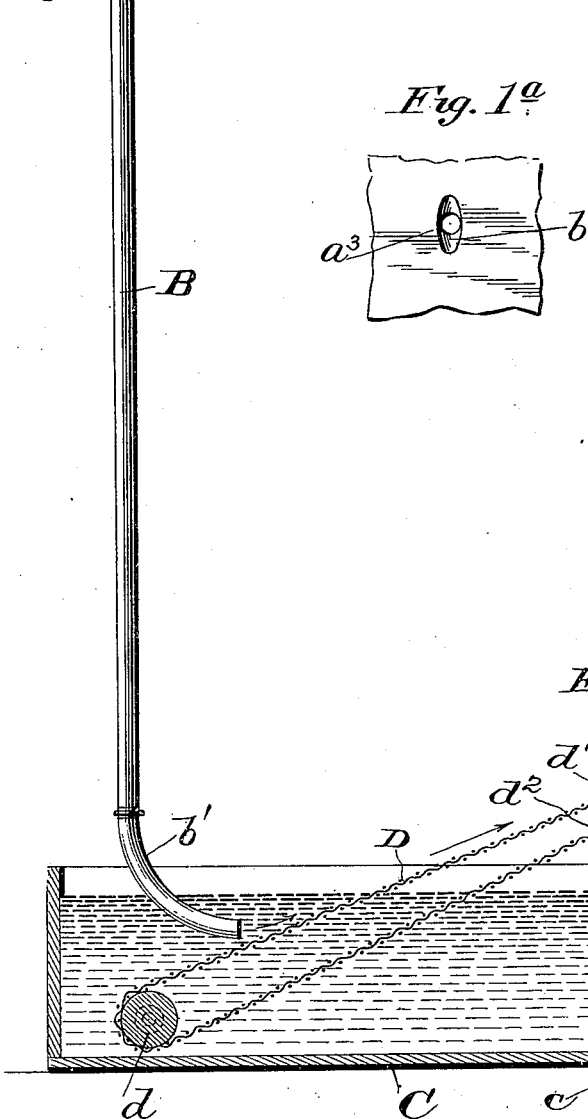
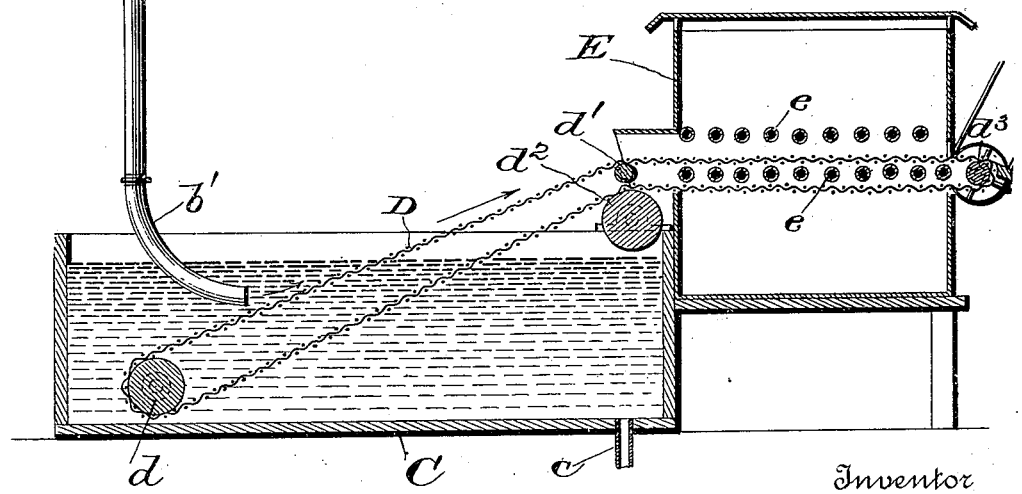
Witnesses
L. C. Hills
B. W. Brackett
Inventor
William Arch Hudson
By Whitaker & Prevost Attorneys
THE NORRIS PETERS CO., PHOTO-LITHO., WASHINGTON, D. C.

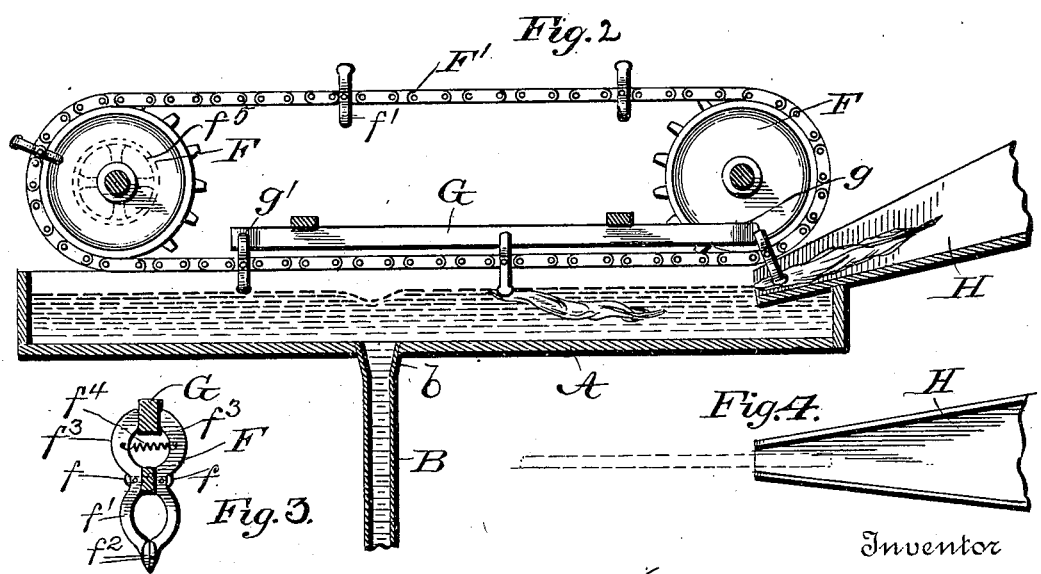

UNITED STATES PATENT OFFICE.

WILLIAM ARCH HUDSON, OF WASHINGTON, DISTRICT OF COLUMBIA, ASSIGNOR, BY MESNE ASSIGNMENTS, TO THE PNEUMATIC TOBACCO STEMMER COMPANY, OF SAME PLACE.

PROCESS OF SEPARATING FLEXIBLE PORTIONS OF LEAVES FROM THEIR STEMS.

SPECIFICATION forming part of Letters Patent No. 667,316, dated February 5, 1901.

Application filed February 28, 1899. Serial No. 707,178. (No specimens.)

*To all whom it may concern:*

Be it known that I, WILLIAM ARCH HUDSON, a citizen of the United States, residing at Washington, in the District of Columbia, have invented certain new and useful Improvements in Processes of Separating the Flexible Portions of Leaves from Their Stems; and I do hereby declare the following to be a full, clear, and exact description of the invention, such as will enable others skilled in the art to which it appertains to make and use the same.

My invention consists of a new method or process of separating tobacco-leaves from their stems, the characteristic feature of which is that the leaf portion is stripped from the stem by the suction of a current of liquid to the action of which the leaf is presented. This I believe to be broadly new with me.

In the accompanying drawings I have illustrated apparatus for carrying my process into effect, and my invention is fully disclosed in the following description and claims.

Referring to the said drawings, Figure 1 represents a sectional view of an apparatus capable of carrying my invention into effect. Fig. 1$^a$ is a detail view of a part thereof. Fig. 2 is a detail view of a mechanical feeding mechanism for the apparatus shown in Fig. 1. Figs. 3 and 4 are views of details of the feeding apparatus.

The object of my invention is to remove the side portions of the leaves of tobacco from the stems without injuring the leaves and in such manner as to have none of the leaf adhere to the stem.

I have discovered that by subjecting the leaf to the suction of a current of fluid, such as air or other gas or water or other fluid, and holding the stem firmly the lateral portions of the leaf will be instantly stripped cleanly from the stem. The leaf may be presented to the action of the suction of the current of fluid by hand or by mechanical means, and in either case the stem is gripped, preferably, at a point but a short distance from the apex of the leaf. The action is facilitated by moving the leaf slightly over the vortex of the current in a direction which will bring the portions of the leaf from the point of seizure toward the butt successively over the vortex. The action of stripping the leaf from the stem is practically instantaneous.

In Figs. 1 and 1$^a$ I have shown an apparatus for carrying my invention into effect. In the said figures, A represents a shallow tank or reservoir provided with an inlet or supply pipe $a$ for delivering water or other liquid thereto. The pipe $a$ is preferably provided with a valve $a'$, to which is attached a regulating-float $a^2$, so that the liquid in the tank is always maintained at a determined depth. In the bottom of the tank is a discharge-orifice $a^3$, preferably of oval form, as shown in Fig. 1$^a$, and B is a discharge-pipe provided at its upper end with a portion $b$, flattened slightly to fit said aperture $a^3$. It is not essential that this aperture $a^3$ should be of the form shown, and it may be circular and of the size of the pipe B, if desired. At the lower end of pipe B, I prefer to provide a receiving-tank C, provided with an outlet $c$, and to provide the lower end of the pipe with a curved portion $b'$, so that the pipe will discharge horizontally and below the level of the liquid in the tank C, as shown. By this means the tobacco-leaves will be delivered into tank C without shock and will not be injured in any way. In order to quickly remove the leaves from the liquid in tank C and to deprive them of the excess of moisture imparted to them by passing through the liquid in tanks A and C and pipe B, I provide an endless belt or apron D, of wire-netting or other suitable perforated material, passing around a roller $d$, mounted in suitable bearings within tank C below the pipe B, over guide-rollers $d'$ $d^2$, mounted, preferably, on the upper edge of the tank C, and around a driving-roller $d^3$ at a distance from said tank, so that the tobacco-leaves discharged from pipe B will be caught up by the said endless belt or apron and quickly removed from the tank C, the water draining from them through the belt or apron. The driving-roller $d^3$ is provided with a band-pulley $d^4$, by means of which it can be driven from any suitable source of power. E represents a drying-oven through which a portion of the belt or apron D passes, said oven being provided with heating means, in this instance a series of steam-pipes e e. The damp leaves are carried from the tank C through this oven, where they will be partly or wholly dried as desired, and will then be delivered by the apron D into a suitable receptacle or wherever desired. The operation of this device is as follows: The fluid-supply being turned on through pipe $a$, the fluid will fill tank A to the level determined by the float $a^2$ and valve $a'$ and will maintain this level while the fluid will run down the pipe B into tank C. At the upper end of pipe B a suction will be created, the downward force of which will be regulated by the weight of the column of water in pipe B. I have found that a column of water from eight to twelve feet in height and from three-quarters of an inch to one and one-half inches in diameter gives good results; but I do not limit myself to any exact size or length of pipe for this purpose. The tobacco-leaves having been previously "cased" or dampened, as is customary before removing the stems, the operator takes the leaves one at a time, gripping them by the stem a short distance from the apex of the leaf, and moves them on the surface of the water over the discharge-orifice of the tank A. The apex of the leaf will be sucked or drawn downward into the pipe B by the suction of the current and the entire leaf will follow, stripping the lateral portions from the stem and leaving the naked stem in the grip of the operator. It will be noted that the leaf is removed from the stem, beginning from a point near the apex of the leaf and running back toward the butt, thus leaving in the flexible portions of the leaf a small part of the extreme end of the stem and all the laterally-extending fibers, as is required by the most careful hand-stemming. The leaf is thus left in a single piece, the two side portions being united at the apex. In its passage down the pipe B and into tank C the leaf is entirely freed from sand, dirt, and other foreign matter, and when discharged into tank C it is caught by the apron D, quickly carried up out of the liquid, being thereby drained, and is then passed by the apron through the drying-chamber E, where the surplus moisture is removed. The leaves may, however, be removed from the tank C by hand, if preferred, and dried in any suitable manner. The time required for the removal of the stem and the passage of the leaf through the pipe B and tank C is but a fraction of a second, and the leaf will not have time to absorb any material quantity of the fluid, so that when delivered by the apron D it will be in substantially the same condition that it was in before the stem was removed.

In Fig. 2 I have shown a feeding device for automatically presenting the leaves to the action of the suction of the fluid-current. In this figure, A is the tank and B is the delivery-pipe previously described. F F represent sprocket-wheels mounted in a suitable frame, (not shown,) over which passes a sprocket-chain F'. Certain links of said chain located at intervals of about twelve or fifteen inches are provided laterally with ears $f f$, in which are pivoted levers $f' f'$, the outer ends of which are provided with gripping-jaws $f^2 f^2$, adapted to grip the stems in the same manner as they would be gripped by the operator if they were fed by hand. The upper ends $f^3 f^3$ of said levers are adapted to engage a stationary rail G, having wedge-shaped ends $g g'$, presenting inclined faces to the ends $f^3 f^3$ of said levers. The jaws $f^2 f^2$ are normally held apart by a spring $f^4$, connected in this instance to the upper ends $f^3 f^3$ of the levers. When the said upper ends of said levers engage the wedge-shaped end $g$ of the rail G, the jaws $f^2 f^2$ are forced together, and beneath this end of the rail I provide a chute H, upon which the leaves are laid successively by hand in such positions that the stem of each will be gripped near the apex by said jaws. As the chain continues to move, these jaws will be held clamped upon the stem until the leaves are passed over the pipe B, when the leaf will be stripped from the stem, as before described, and beyond this point the ends $f^3 f^3$ of the leaves $f' f'$ will engage the wedge-shaped portion of the rail G and will release the stem, which can be removed from the tank in any desired way. The shaft of one of the sprocket-wheels F is provided with a driving-pulley $f^5$, by means of which power can be applied to operate the wheels F F and chain F'.

The apparatus herein shown and described is not claimed herein, as said apparatus is covered by my application for Letters Patent of the United States, Serial No. 19,604, filed June 8, 1900, which is a division of this application.

What I claim, and desire to secure by Letters Patent, is—

1. The process of separating the flexible portions of tobacco-leaves from their stems which consists in presenting the leaf to the suction of a current of liquid and holding back the stem, whereby the leaf is sucked into said current and stripped from the stem, substantially as described.

2. The process of separating the flexible portions of tobacco-leaves from their stems, which consists in creating a current of liquid in a contracted passage, gripping the stems at a point adjacent to the apex of the leaf, presenting the leaf to the suction of the current of liquid and holding back the stem, whereby the leaf is stripped from the stem, substantially as described.

In testimony whereof I affix my signature in the presence of two witnesses.

WILLIAM ARCH HUDSON.

Witnesses:
L. P. WHITAKER,
LORENZO D. LORENTZ.